J. H. WORKMAN.
GREASE RETAINER.
APPLICATION FILED AUG. 28, 1919.

1,359,139.  Patented Nov. 16, 1920.

INVENTOR
John H. Workman
BY: Frease, Merkel, Saywell and Bond
ATTY'S.

UNITED STATES PATENT OFFICE.

JOHN H. WORKMAN, OF NEWCASTLE, PENNSYLVANIA.

GREASE-RETAINER.

1,359,139.  Specification of Letters Patent.  Patented Nov. 16, 1920.

Application filed August 28, 1919. Serial No. 320,409.

*To all whom it may concern:*

Be it known that I, JOHN H. WORKMAN, a citizen of the United States, residing at Newcastle, in the county of Lawrence and State of Pennsylvania, have invented a new and useful Grease-Retainer, of which the following is a specification.

This invention relates to improvements in grease retainers and more especially to a device adapted to prevent the grease or lubricant from the rear axle casings of motor vehicles from leaking out upon the wheels.

With the usual construction of grease cups or grease retainers for use upon axle casings a considerable portion of the lubricating grease leaks from the casing on to the wheels not only causing an unsightly appearance but often leaking on to the brake drum and brake band preventing the brake from operating properly and making it dangerous to drive the automobile in this condition.

The objects of the present invention are to provide a device adapted to prevent grease from leaking from the rear axle casing upon the wheels.

A further object is to produce a device of this character which shall be extremely simple and which may be readily attached to any ordinary construction of automobile and which shall be thoroughly effective for the purpose designed.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

The invention thus set forth in general terms is illustrated in the accompanying drawings forming part hereof, in which—

A practical embodiment of the invention is disclosed in the accompanying drawings, forming a part of this specification in which similar numerals of reference indicate corresponding parts throughout the several views.

Figure 1:
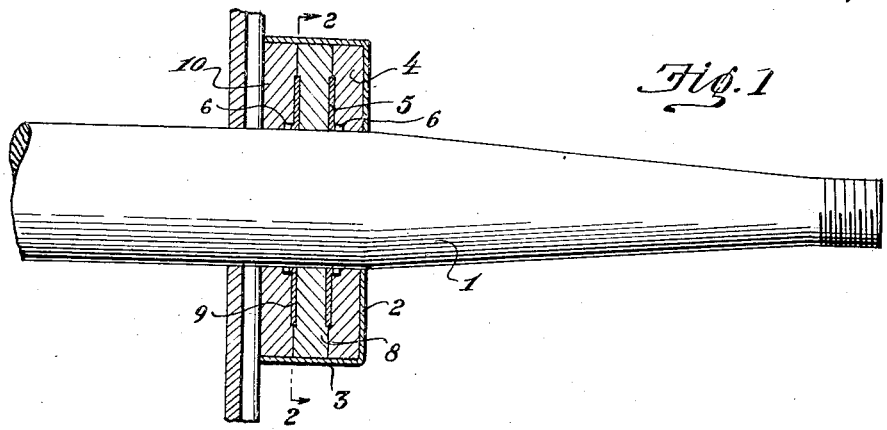
Figure 1 is a longitudinal section of the device.
Figure 2:
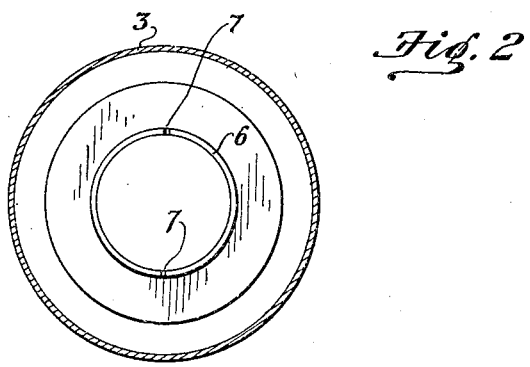
Fig. 2 is a section on the line 2—2, Fig. 1.

Referring to the construction illustrated in the accompanying drawings, the numeral 1 indicates a portion of the rear axle of an automobile upon which is mounted a cap 2 having an annular flange 3 around its periphery.

A felt washer 4 is placed within the cap against the inner end thereof, after which the metal washer 5 is placed upon the axle against the outer face of the felt washer 4, said metal washer being provided with an annular flange 6 fitting snugly upon the axle, said flange being preferably notched as shown at 7 to allow it to be more easily placed upon the axle.

A second felt washer 8 is placed against the outer face of the metal washer 5 and a metal washer 9 similar to the washer 5 is placed upon the axle against the outer face of the felt washer 8, the flange upon said metal washer 9, however, being oppositely disposed to the flange 6 upon the washer 5. A third felt washer 10 is placed upon the axle engaging the outer face of the metal washer 9.

From this construction it will be seen that when the device is placed in position upon the axle the leakage of grease from the axle on to the wheels and brakes will be practically eliminated as the grease will have to pass up over each of the metal washers and through the three felt washers before it can leak out upon the wheels and brakes and should any grease leak from the axle through this device it will be absorbed by the felt washers before it will pass entirely through the grease retainer.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:

A grease retainer for an axle including a cup comprising an end wall having a central opening to receive the axle spindle and an annular flange formed upon said end wall, spaced metal washers fixed upon the axle spindle within the cup and provided with annular flanges engaging the spindle, a felt washer mounted upon the spindle between said spaced metal washers, a felt washer mounted upon the spindle between the end wall of the cup and the adjacent metal washer and a felt washer mounted upon the spindle upon the outer side of the other metal washer, all of said felt washers engaging the inner surface of said annular flange upon the cup.

In testimony that I claim the above, I have hereunto subscribed my name.

JOHN H. WORKMAN.